United States Patent
Tanaka

(10) Patent No.: US 7,594,965 B2
(45) Date of Patent: Sep. 29, 2009

(54) BEAM HOMOGENIZER AND LASER IRRADIATION APPARATUS AND METHOD OF MANUFACTURING SEMICONDUCTOR DEVICE

(75) Inventor: Koichiro Tanaka, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 403 days.

(21) Appl. No.: 10/664,916

(22) Filed: Sep. 22, 2003

(65) Prior Publication Data
US 2004/0058553 A1  Mar. 25, 2004

(30) Foreign Application Priority Data
Sep. 19, 2002 (JP) .............................. 2002-272812

(51) Int. Cl.
*C30B 1/04* (2006.01)
(52) U.S. Cl. ..................... 117/3; 117/4; 117/8; 117/9; 250/216; 250/235
(58) Field of Classification Search ............ 117/3, 117/4, 8, 9; 250/216, 235
See application file for complete search history.

(56) References Cited

U.S. PATENT DOCUMENTS

| 4,733,944 A | 3/1988 | Fahlen et al. |
| 4,744,615 A | 5/1988 | Fan et al. |
| 4,793,694 A | 12/1988 | Liu |
| 4,830,447 A | 5/1989 | Kamiyama |
| 5,080,474 A * | 1/1992 | Miyamoto .................. 359/710 |
| 5,224,200 A | 6/1993 | Rasmussen et al. |
| 5,285,509 A | 2/1994 | Reeder et al. |
| 5,303,084 A | 4/1994 | Pflibsen et al. |
| 5,825,551 A | 10/1998 | Clarkson et al. |
| 5,886,313 A | 3/1999 | Krause et al. |
| 5,900,980 A | 5/1999 | Yamazaki et al. |
| 6,002,523 A * | 12/1999 | Tanaka ....................... 359/624 |
| 6,038,075 A | 3/2000 | Yamazaki et al. |
| 6,078,652 A | 6/2000 | Barak |
| 6,104,535 A | 8/2000 | Tanaka |
| 6,137,633 A | 10/2000 | Tanaka |

(Continued)

FOREIGN PATENT DOCUMENTS

CN     1448753     10/2003

(Continued)

OTHER PUBLICATIONS

European Search Report, Jan. 26, 2004.

(Continued)

Primary Examiner—Robert M Kunemund
(74) Attorney, Agent, or Firm—Eric J. Robinson; Robinson Intellectual Property Law Office, P.C.

(57) ABSTRACT

The inhomogeneous energy distribution at the beam spot on the irradiated surface is caused by a structural problem and processing accuracy of the cylindrical lens array forming an optical system.

According to the present invention, in the optical system for forming a rectangular beam spot, an optical system for homogenizing the energy distribution of the shorter side direction of a rectangular beam spot of a laser light on an irradiated surface is replaced with a light guide. The light guide is a circuit that can confine emitted beams in a certain region and guide and transmit its energy flow in parallel with the axis of a path thereof.

44 Claims, 10 Drawing Sheets

U.S. PATENT DOCUMENTS

| | | | |
|---|---|---|---|
| 6,157,492 | A | 12/2000 | Yamazaki et al. |
| 6,176,926 | B1 * | 1/2001 | Tanaka ................ 117/92 |
| 6,212,012 | B1 | 4/2001 | Tanaka |
| 6,215,595 | B1 | 4/2001 | Yamazaki et al. |
| 6,236,449 | B1 | 5/2001 | Tanitsu |
| 6,239,913 | B1 | 5/2001 | Tanaka |
| 6,285,443 | B1 | 9/2001 | Wangler et al. |
| 6,291,320 | B1 | 9/2001 | Yamazaki et al. |
| 6,304,385 | B1 | 10/2001 | Tanaka |
| 6,310,727 | B1 * | 10/2001 | Tanaka ................ 359/624 |
| 6,388,812 | B2 | 5/2002 | Yamazaki et al. |
| 6,393,042 | B1 * | 5/2002 | Tanaka ................ 372/101 |
| 6,437,284 | B1 * | 8/2002 | Okamoto et al. ....... 219/121.73 |
| 6,437,313 | B2 * | 8/2002 | Yamazaki et al. .......... 250/216 |
| 6,441,965 | B2 | 8/2002 | Yamazaki et al. |
| 6,563,843 | B1 | 5/2003 | Tanaka |
| 6,573,162 | B2 * | 6/2003 | Tanaka et al. ............... 438/487 |
| 6,587,277 | B2 | 7/2003 | Yamazaki et al. |
| 6,693,257 | B1 | 2/2004 | Tanaka |
| 6,738,396 | B2 | 5/2004 | Filgas et al. |
| 6,785,304 | B2 | 8/2004 | Filgas |
| 6,856,727 | B2 | 2/2005 | Li |
| 7,169,630 | B2 | 1/2007 | Moriwaka |
| 2001/0010702 | A1 | 8/2001 | Tanaka |
| 2002/0003666 | A1 | 1/2002 | Yamazaki et al. |
| 2002/0146873 | A1 * | 10/2002 | Tanaka ................ 438/166 |
| 2002/0196419 | A1 | 12/2002 | Mizouchi |
| 2002/0196551 | A1 | 12/2002 | Yamazaki et al. |
| 2003/0024905 | A1 | 2/2003 | Tanaka |
| 2003/0061984 | A1 | 4/2003 | Maekawa et al. |
| 2003/0068836 | A1 * | 4/2003 | Hongo et al. ................. 438/30 |
| 2003/0203549 | A1 | 10/2003 | Yamazaki et al. |
| 2004/0179807 | A1 | 9/2004 | Tanaka |
| 2004/0213514 | A1 | 10/2004 | Tanaka et al. |
| 2005/0031261 | A1 | 2/2005 | Tanaka |
| 2005/0079645 | A1 | 4/2005 | Moriwaka |

FOREIGN PATENT DOCUMENTS

| | | |
|---|---|---|
| EP | 0 747 772 | 12/1996 |
| EP | 0 805 368 | 11/1997 |
| EP | 1 063 049 | 12/2000 |
| EP | 1 122 020 | 8/2001 |
| GB | 2 044 948 | 10/1980 |
| JP | 08-338962 | 12/1996 |
| JP | 09-234579 | 9/1997 |
| JP | 2001-291681 | 10/2001 |
| JP | 2002-184206 | 6/2002 |
| JP | 2003-287703 | 10/2003 |

OTHER PUBLICATIONS

European Search Report of Jan. 26, 2004 for Application No. 03021233.6.

Kahlert et al., Poly-Silicon Thin Film Transistor Technology and Applications in Displays and Other Novel Technology Areas, *High Resolution Optics for Thin Si-Film Crystallization Using Excimer Lasers: Present Status and Future Development*, vol. 5004 (2003), pp. 20-27.

* cited by examiner

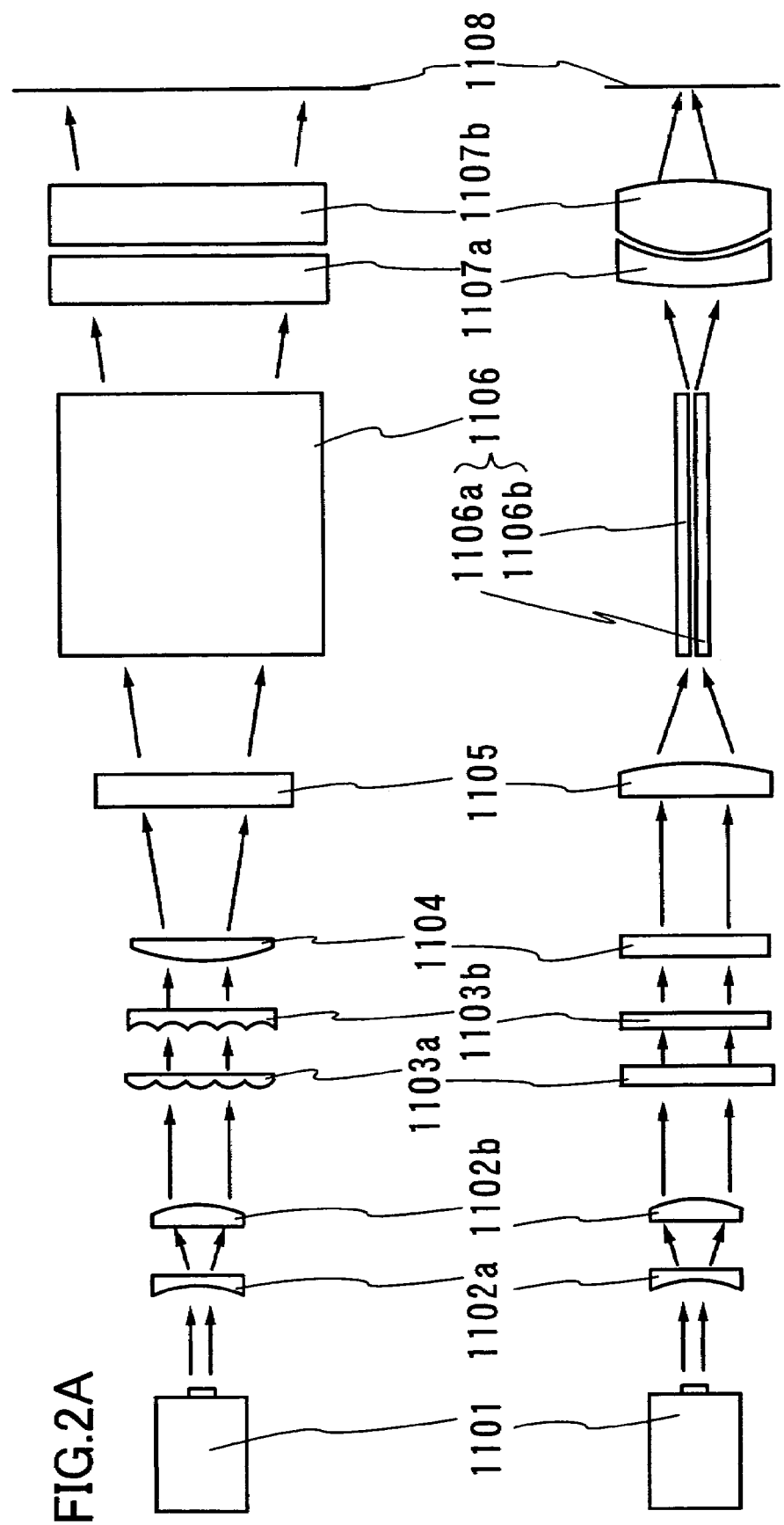

Current X Slice

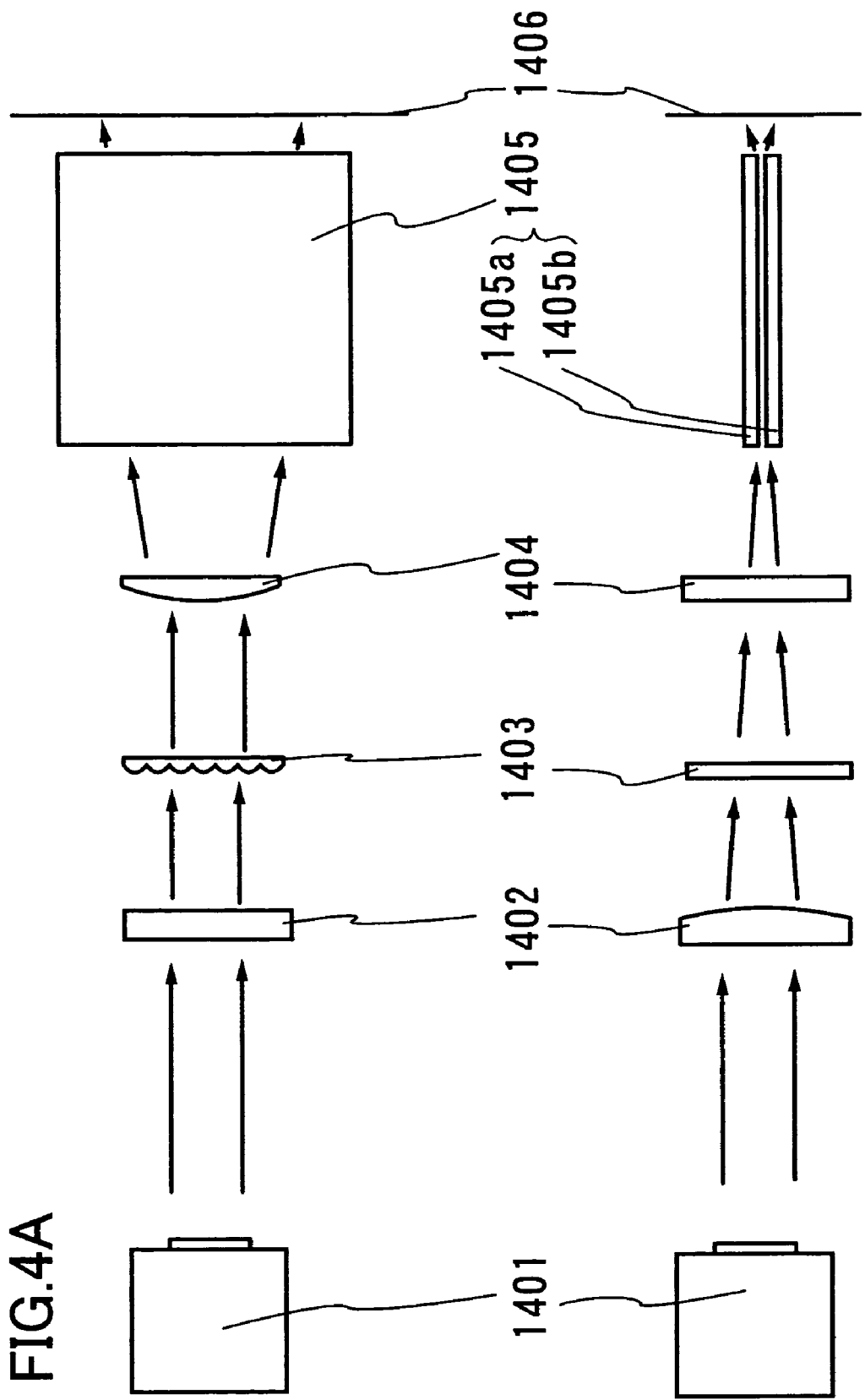

Current X Slice

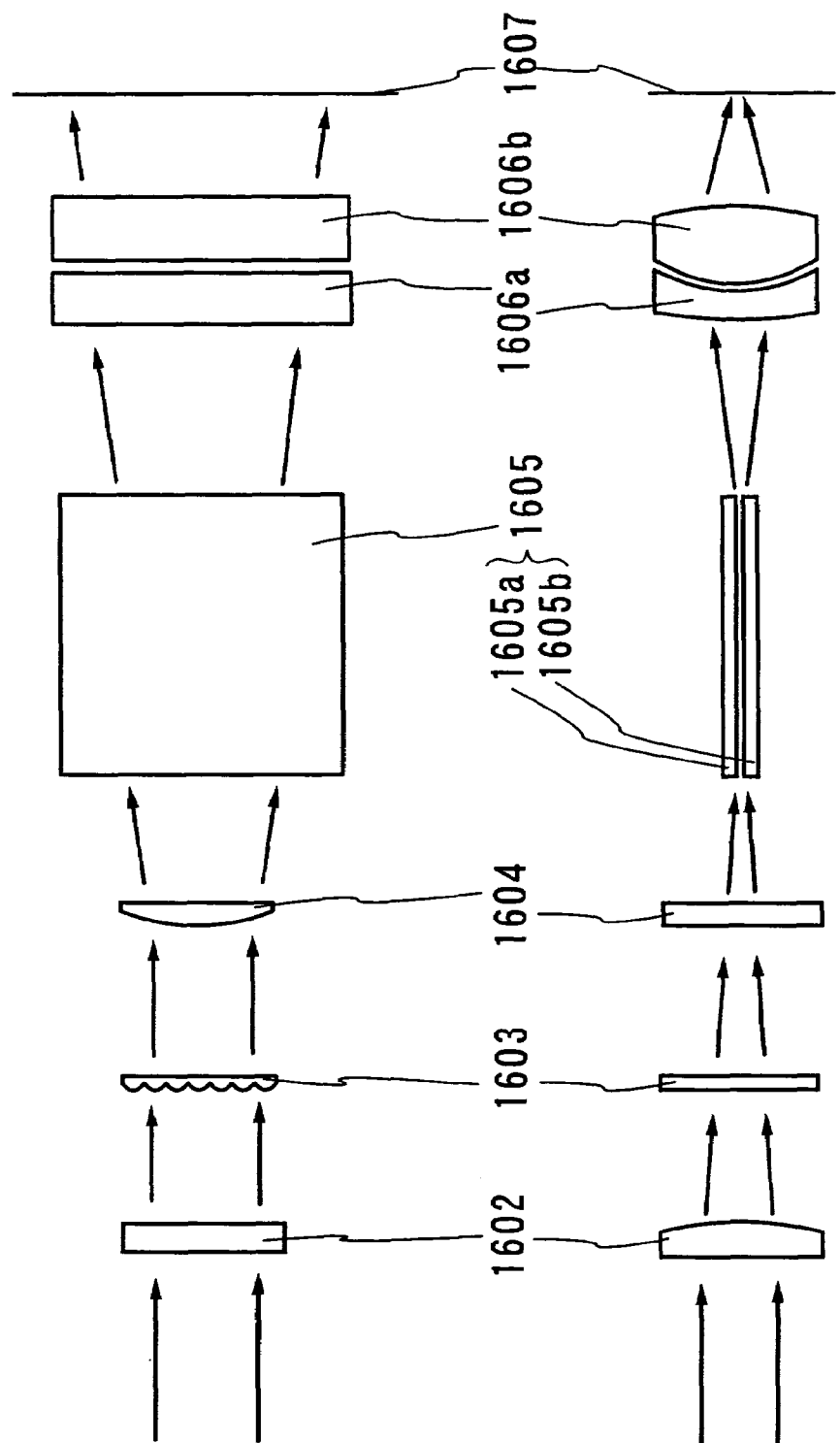

Current X Slice

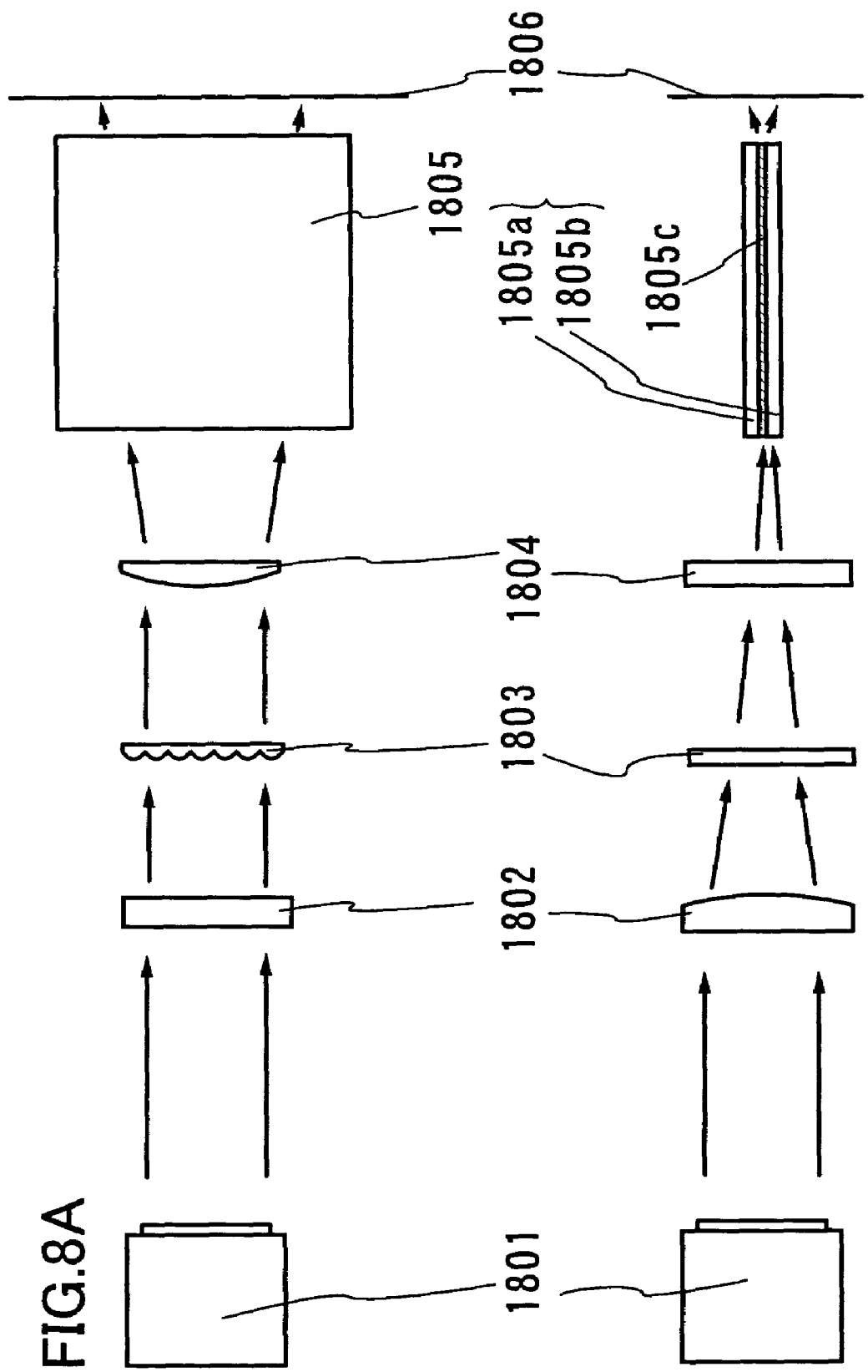

Current X Slice

PRIOR ART

BEAM HOMOGENIZER AND LASER IRRADIATION APPARATUS AND METHOD OF MANUFACTURING SEMICONDUCTOR DEVICE

BACKGROUND OF THE INVENTION

1. Field of the Invention

The present invention relates to a beam homogenizer which homogenizes a beam spot on a surface to-be-irradiated in a specified area, and further relates to a laser irradiation apparatus which irradiates a homogenized beam spot on a surface to-be-irradiated. Note that, a semiconductor device according to the present invention includes a display device such as an active matrix liquid crystal display device and an active matrix electro luminescence display device, an electro-optical device, and an electrical appliance utilizing such a display device or an electro-optical device, and the present invention also relates to a method of manufacturing the semiconductor device.

2. Description of the Related Art

Recently a technique of laser annealing that crystallizes or enhances crystallinity of an amorphous semiconductor film or a crystalline semiconductor film (a semiconductor film having crystallinity such as polycrystallinity or microcrystallinity except for single crystallinity) formed on an insulating substrate of glass or the like has widely studied. The semiconductor film is generally formed of a silicon semiconductor film.

In comparison with a quartz substrate that has been commonly used, a glass substrate is more economical, has higher workability and has the advantage that a substrate having a large area can be easily produced. This is the reason why the studies have been extensively conducted. A laser is preferably used for crystallization because the melting point of a glass substrate is low. The laser can impart high energy only to the non-single crystal semiconductor film without changing the temperature of the substrate greatly.

A crystalline silicon film formed by performing the laser annealing has a high mobility. Therefore, thin film transistors (TFTs) are formed by employing the crystalline silicon film, and they are generally used for, for example, a monolithic liquid-crystal electro-optical device in which the TFTs for pixels and for driver circuits are fabricated on one glass substrate. Since the crystalline silicon film is formed of a large number of crystal grains, it is called a "poly-crystalline silicon film" or a "poly-crystalline semiconductor film".

Besides, a method wherein a beam from a pulsed laser beam of high power, such as an excimer laser, is processed by an optical system so as to define a tetragonal spot having a size of several cm square or a line having a length of at least 10 cm on a surface to-be-irradiated, and the projected position of the beam spot is scanned relatively to the surface to-be-irradiated, thereby carrying out the laser annealing, is preferably used since it has good productivity and is industrially superior.

When a linear beam spot is used, particularly, unlike in the case of using a punctiform beam spot that needs scanning in the forward, backward, right and left directions, the entire surface to-be-irradiated can be irradiated with the beam by scanning only in a direction perpendicular to the long side of the linear beam spot. This leads to high productivity. The linear beam spot here shall be a rectangular beam spot that has a high aspect ratio. Scanning is carried out in a direction perpendicular to the long side because it is the most efficient scanning direction. Because of the high productivity, the use of a linear beam spot obtained by processing a pulse excimer laser beam by an adequate optical system in laser annealing is becoming a mainstream in the manufacturing technology at present.

An example of an optical system for linearizing the shape of a beam spot (the sectional shape of a laser beam) on the irradiated surface is shown in FIG. 10. This optical system shown in FIG. 10 is a very general one. The aforementioned optical systems not only transform the sectional shape of the laser beam into a linear shape, but also homogenize the energy of the beam spot in the irradiated surface at the same time. Generally, an optical system that homogenizes the energy of a beam is referred to as a beam homogenizer. Namely, an optical system shown in FIG. 10 is also a beam homogenizer.

When the excimer laser, which is ultraviolet light, is used as a light source, the host material of the above-mentioned optical system may be entirely quartz, for example. The reason for using quartz resides in that a high transmittance can be obtained. Further, a coating with 99% or more transmittance on wavelength of the excimer laser that is used may preferably be employed.

FIG. 10A showing the side view will be explained first. A laser beam emitted from a laser oscillator 1201 splits the laser beam in one direction by cylindrical lens arrays 1202a and 1202b. The direction shall be referred to as a longitudinal direction here. When a mirror is incorporated midway of the optical system, the longitudinal direction will follow the direction of light reflected by the mirror. The beam spot of this structure is split into 4 beams. The split spots are then collected to 1 beam spot by a cylindrical lens 1204. Then, the spot is split again and reflected at a mirror 1207. Thereafter, the split spots are again collected to 1 beam spot at an irradiated surface 1209 by a doublet cylindrical lens 1208. A doublet cylindrical lens is a lens that is formed of two pieces of cylindrical lenses. Consequently, the energy in the longitudinal direction of the linear beam spot is homogenized and the length of the longitudinal direction of the linear beam spot is determined.

FIG. 10B showing the top view will be explained next. A laser beam emitted from the laser oscillator 1201 is split in a direction perpendicular to the longitudinal direction by a cylindrical lens array 1203. The perpendicular direction shall be referred to as a lateral direction here. When a mirror is incorporated midway of the optical system, the lateral direction will follow the direction of light reflected by the mirror. The beam spot in this structure is split into 7 beams. Thereafter, the laser beams split into 7 beams by the cylindrical lens 1205 are collected to 1 beam spot at the irradiated surface 1209. The steps shown with reference numerals 1207 to 1209 are drawn in broken lines; the broken lines show the positions of accurate light paths, lenses, and the irradiated surface in the case where the mirror 1207 is not arranged. Thus, the energy in the lateral direction of the linear beam spot is homogenized and the length of the lateral direction is also determined.

As described above, the cylindrical lens arrays 1202a, 1202b and 1203 work as lenses which split laser beams. Homogeneity of the energy distribution at the linear beam spot depends on the number of split beams.

The above lenses in the optical system are made of synthetic quartz responsive to an excimer laser. Further, the lenses are coated on the surfaces so that the excimer laser can transmit easily. Therefore, the transmittance of an excimer laser through one lens can be 99% or more.

The linear beam spot linearized with the above structure of the optical system is irradiated in an overlapping manner with gradual shifts to the lateral direction thereof. That allows to crystallize and to enhance the crystallinity of the entire surface of a non-single crystal silicon film by performing laser annealing.

A typical method of manufacturing a semiconductor film that is to be the object to be irradiated by a laser beam is shown next. First, a 5 inch square Corning 1737 substrate having a thickness of 0.7 mm is prepared as the substrate. Then a 200 nm-thick $SiO_2$ film (silicon oxide film) is formed and a 50 nm-thick amorphous silicon film (hereinafter denoted by a-Si film) is formed on the surface of the $SiO_2$ film. Both films are formed by employing the plasma CVD apparatus. The substrate is exposed under an atmosphere containing nitrogen gas at a temperature of 500° C. for 1 hour thereby reducing the hydrogen concentration in the film. Accordingly, resistance of the film to a laser is remarkably improved.

The XeCl excimer laser L4308 (wavelength: 308 nm, pulse width: 30 ns) manufactured by Lambda Co. is used as the laser oscillator. This laser oscillator generates a pulse oscillation laser and has the capacity to emit energy of 670 mJ/pulse. The spot size of the laser beam at the exit of the laser beam is 10×30 mm (both half-width). The exit of the laser beam is defined by the plane perpendicular to the direction the laser beam is traveling, immediately after the laser beam is emitted from the laser oscillator.

The shape of the laser beam generated by the excimer laser is generally rectangular and is expressed by an aspect ratio which falls under the range of the order of 1 to 5. The intensity of the laser beam spot indicates the Gaussian distribution stronger towards the center of the beam spot. The spot size of the excimer laser beam is transformed into a 125 mm×0.4 mm linear laser beam spot having the homogenous energy distribution by the optical system shown in FIG. 10.

When irradiating a laser beam to the above-mentioned semiconductor film, the most suitable overlapping pitch is approximately 1/10 of the short width (half-width) of the linear beam spot. The uniformity of the crystallinity in the semiconductor film is thus improved. According to the above example, the half-width of the linear beam spot was 0.4 mm, and therefore the pulse frequency of the excimer laser was set to 30 hertz and the scanning speed was set to 1.0 mm/s thereby irradiating the laser beam. At this point, the energy density at the irradiated surface of the laser beam was set to 450 mJ/cm$^2$. The method described hitherto is a very general method employed for crystallizing a semiconductor film by using a linear beam spot.

Some conventional beam homogenizers utilize reflecting mirrors that can easily perform an accurate processing. (See Japanese Patent laid-open 2001-291681, for example.)

High processing accuracy is required for manufacturing the cylindrical lens arrays.

A cylindrical lens array is formed of cylindrical lenses arranged in a direction of curved lines. The direction of curved lines here shall refer to the perpendicular direction of the generatrix of the cylindrical surface. Cylindrical lenses forming a cylindrical lens array invariably have connected portions therebetween. The connected portions don't have curved surfaces; a beam irradiated through the connected portions transmits without being affected by the cylindrical lenses. The beam that reaches to the surface to-be-irradiated without the effect can cause the inhomogeneous energy distribution at the rectangular beam spot on the irradiated surface.

The cylindrical lenses forming the cylindrical lens array are necessarily fabricated with all the same accuracy. When the cylindrical lenses have different curvatures, laser beams split by the cylindrical lens array are not collected to the same position at an irradiated surface even by a condensing lens. Namely, the energy distribution at the rectangular beam spots on the irradiated surface is not homogenized The inhomogeneous energy distribution at the beam spot on the irradiated surface is caused by a structural problem and processing accuracy of the cylindrical lens array forming an optical system. Namely, inhomogeneity arises from that all the laser beams induced into a homogenizer are not induced to the part where the cylindrical lenses function and that all the laser beams split by the cylindrical lens array are not collected to the same position.

Further, when the semiconductor film is crystallized by scanning a rectangular beam spot having the energy distribution in the direction of the short side of the rectangular on the irradiated surface indicating the gaussian distribution by the means described in the Related Art, a striped pattern in a direction perpendicular to the scanning direction appears clearly on the semiconductor film. The striped pattern synchronizes with inhomogeneous crystallinity of the semiconductor film. For example, the inhomogeneity emerges as a dispersion of electrical characteristics of a TFT, and the striped pattern is displayed on a panel employing the TFT.

The striped pattern is due to an instable output of a laser oscillator. Accordingly, the only way to eliminate the striped pattern is improving a laser oscillator. However, when the energy distribution in the direction of the short side of the rectangular beam spot on the irradiated surface is homogenized, the instability of the output of the laser oscillator is averaged and the striped pattern will fade into the background. Namely, the emergence of the striped pattern is inhibited. Accordingly, an optical system homogenizing the energy distribution has been required. Naturally, a rectangular beam spot with the homogeneous energy distribution can be obtained by employing a cylindrical lens array, however, a highly accurate optical system has been required.

SUMMARY OF THE INVENTION

According to the invention, in the optical system for forming a rectangular beam spot, an optical system for homogenizing a rectangular beam spot on an irradiated surface in energy distribution of a shorter side direction of the spot is replaced with a light guide. The light guide is a circuit having the ability to trap a light emission in a certain region and guide and transmit its energy flow in parallel with the axis of a path thereof.

Means for solving the foregoing problems will be illustrated below. FIGS. 1A and 1B show schematic diagrams of assistance in explaining means for solving the foregoing problems. First, the top view FIG. 1A, one of the schematic diagrams, will be described. The light guide 1302 having two reflective surfaces facing to each other and an irradiation surface 1303 are prepared to launch a light beam toward them from the left side of the drawing sheet. The light beam is represented by a solid line 1301a when the light guide 1302 is present. Also, the light beam is represented by a broken line 1301b when the light guide 1302 is not present.

In the case where the light guide 1302 is not present, light beams incident from the left side of the sheet reach regions of the irradiation surface 1303a, 1303b, and 1303c, as shown with the light beam 1301b.

In the case where the light guide 1302 is present, incident light beams are reflected by the reflective surfaces of the light guide 1302 and all of them reach a region of the irradiation surface 1303b, as shown with the light beam 1301a. That is to say, in the case where the light guide 1302 is present, all of the incident light beams, which should reach regions of the irradiation surface 1303a and 1303c when the light guide 1302 is not present, reach a region of the irradiation surface 1303b. Accordingly, when a light beam is launched into the light guide 1302, the incident light beam is split and then all of the split beams are overlapped in the same location on the irradiation surface 1303b. Thus splitting an incident light beam to overlap the split light beams in the same location can homogenize the energy distribution of the light in the location where the split beams are overlapped.

In general, the larger the number of beams resulting from the split of a light beam using the homogenizer is, the higher the evenness of energy distribution at a location where the split light beams are overlapped is. A larger number of reflections inside the light guide 1302 can increase the number of beams resulting from the split of a light beam. In other words, making the two reflective surfaces of the light guide longer in a direction of launching light beams thereinto may increase the number of reflections described above. Also, making the spacing between the reflective surfaces facing to each other smaller can increase the number of beams into which a beam is split.

According to another configuration of the invention, in the optical system for forming a rectangular beam spot, an optical system for homogenizing a rectangular beam spot on an irradiated surface in energy distribution in a direction of a shorter side of the spot is replaced with a light pipe. The light pipe is a member formed into a cone, a pyramid, a cylinder, or the like by pultrusion, which typically transmits from one end thereof to the other by reflection.

The laser apparatus herein disclosed is characterized by having a homogenizer including a light guide or a light pipe as described above. The light guide having two reflective surfaces facing to each other or a light pipe can homogenize a rectangular beam spot on an irradiated surface in energy distribution of a shorter side direction.

In manufacturing a semiconductor device, the use of the above laser irradiation apparatus can curb the occurrence of stripe patterns, which results from the inhomogeneous energy in a beam spot on an irradiated surface, and improve the homogeneous of a semiconductor film crystallinity.

In accordance with one aspect of the present invention, the method of the present invention comprises the steps of providing a laser beam, passing the laser beam through a light guide, and irradiating a semiconductor film with the laser beam after passing through the light guide to crystallize the semiconductor film, wherein an energy distribution of the laser beam at a surface of the semiconductor film is homogenized by the light guide.

BRIEF DESCRIPTION OF THE DRAWINGS

In the accompanying drawings:

FIG. 2 shows an example of a laser irradiation apparatus disclosed in the present invention;

FIG. 4 shows an example of a laser irradiation apparatus disclosed in the present invention;

FIG. 6 shows an example of a laser irradiation apparatus disclosed in the present invention;

FIG. 8 shows an example of a laser irradiation apparatus disclosed in the present invention;

DETAILED DESCRIPTION OF THE PREFERRED EMBODIMENTS

Embodiment Mode

Figure 1A:
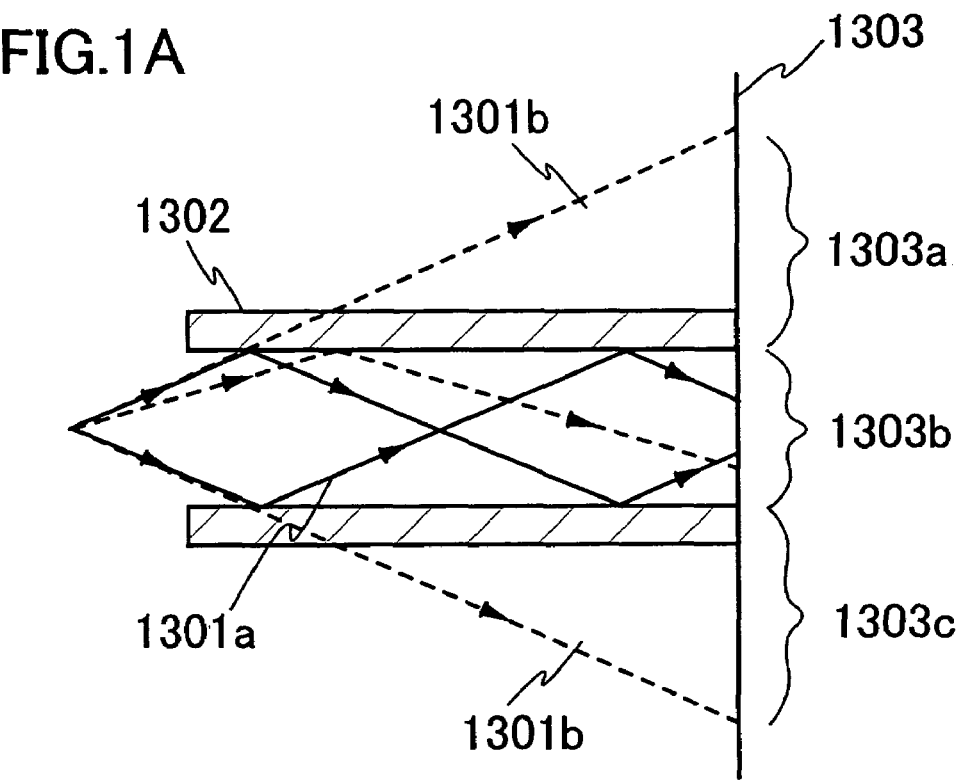
FIG. 1 shows a means of the present invention.
Figure 1B:
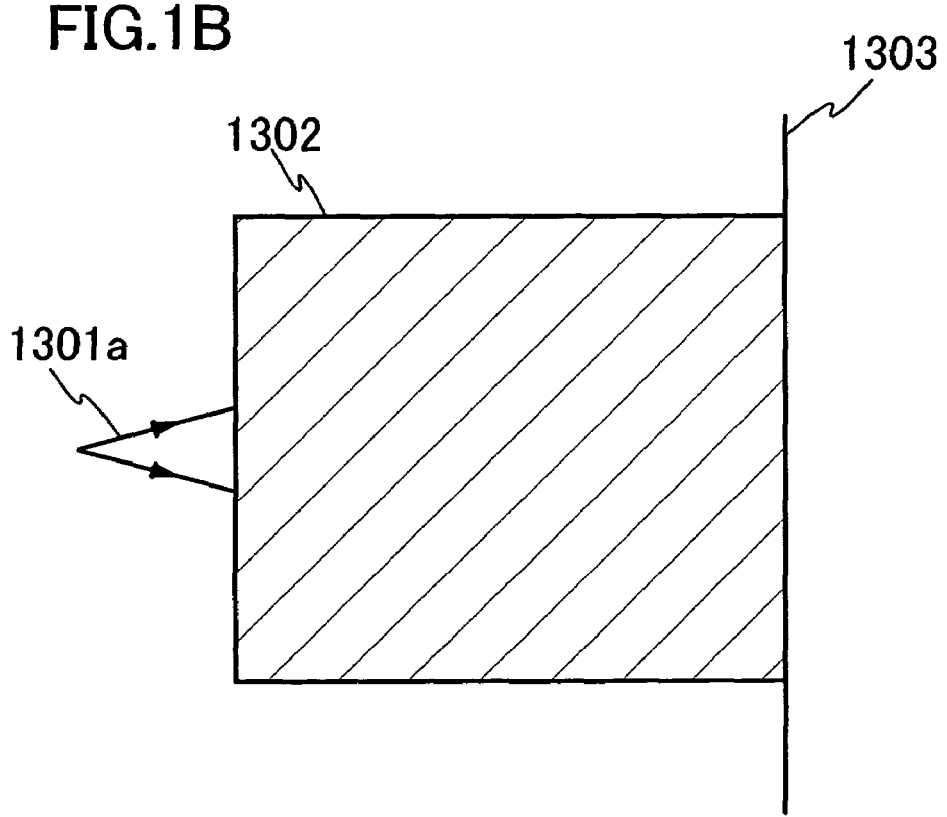

An optical system disclosed by the present invention, which produces a rectangular beam spot is described referring to FIG. 2.

First, a side view in FIG. 2B will be explained. A laser beam emergent from a laser oscillator 1101 is propagated in the direction of arrows indicated in FIG. 2B. The laser beam is expanded by spherical lenses 1102a and 1102b. These components are not necessary in a case where the beam spot emergent from the laser oscillator 1101 is sufficiently large.

A beam spot is converged in the direction of a short side of the rectangle by a cylindrical lens 1105 having a second side with a curvature radius of −486 mm and a thickness of 20 mm. A sign of a curvature radius shall be a plus when the center of the curvature is on the side where the beam exits with respect to the face of a lens, and the sign shall be a minus when the center of the curvature is on the side where the laser enters with respect to the surface of a lens. Further, the face of the lens where the beam enters shall be a first surface, and the face of the lens where the beam exits shall be a second surface. The energy distribution at the short side of the rectangular beam spot on the irradiated surface is homogenized by a light guide 1106 having two reflecting surfaces 1106a and 1106b facing each other, placed 1030 mm behind the cylindrical lens 1105. The light guide 1106 has a length of 300 mm in the direction of a beam emission, and the distance between the reflecting surfaces shall be 2 mm.

In a conventional optical system, the inhomogeneous energy distribution of a rectangular beam spot on an irradiated surface was caused by the problems of a structure and manufacturing accuracy of a cylindrical lens array, and manufacturing accuracy of a cylindrical lens which combines the split laser beams. An optical system according to the present invention having a light guide 1302 can mend the problems mentioned above.

By doublet cylindrical lenses 1107a and 1107b disposed 1250 mm behind, a laser beam exits from the light guide 1106 is converged in the direction of the short side of the rectangular on an irradiated surface 1108 disposed 237 mm behind the doublet cylindrical lenses. A doublet cylindrical lens here refers to a lens formed of two cylindrical lenses. One of the two cylindrical lenses forming the doublet cylindrical lens has a first surface with a curvature radius of 125 mm, a second surface with a curvature radius of +77 mm and a thickness of 10 mm; the other cylindrical lens has a first surface with a curvature radius of +97 mm, a second surface with a curvature radius of −200 mm and a thickness of 20 mm. The two cylindrical lenses have an interval of 5.5 mm therebetween. Consequently, the energy distribution at a short side of a rectangular beam spot is homogenized and the length of the short side direction is determined. The doublet cylindrical lenses are not necessarily used, however, the doublet cylindrical lenses allow an optical system and the irradiated surface to have a space therebetween, and room can be obtained.

The top view of FIG. 2A is explained next. The spot of a laser beam emitted from the laser oscillator 1101 is split in the direction of the long side of a rectangle by the cylindrical lens arrays 1103a and 1103b. The cylindrical lens array 1103a comprises thirty cylindrical lenses each having a curvature radius of 28 mm, a thickness of 5 mm, and a width of 2 mm arranged in a direction of curved lines. The cylindrical lens array 1103b comprises thirty cylindrical lenses each having a curvature radius of −13.33 mm, a thickness of 5 mm and a width of 2 mm arranged in the direction of curved lines. And the cylindrical lens arrays 1103a and 1103b shall have an interval of 88 mm therebetween. Thereafter, the laser beams are combined on the irradiated surface 1108 by a cylindrical lens 1104 having a first surface with a curvature radius of 2140 mm and a thickness of 20 mm disposed 120 mm behind the cylindrical lens 1103b. Consequently, the energy distribution of the long side of the rectangular beam spot is homogenized and the length of the long side direction is determined.

Figure 3A:
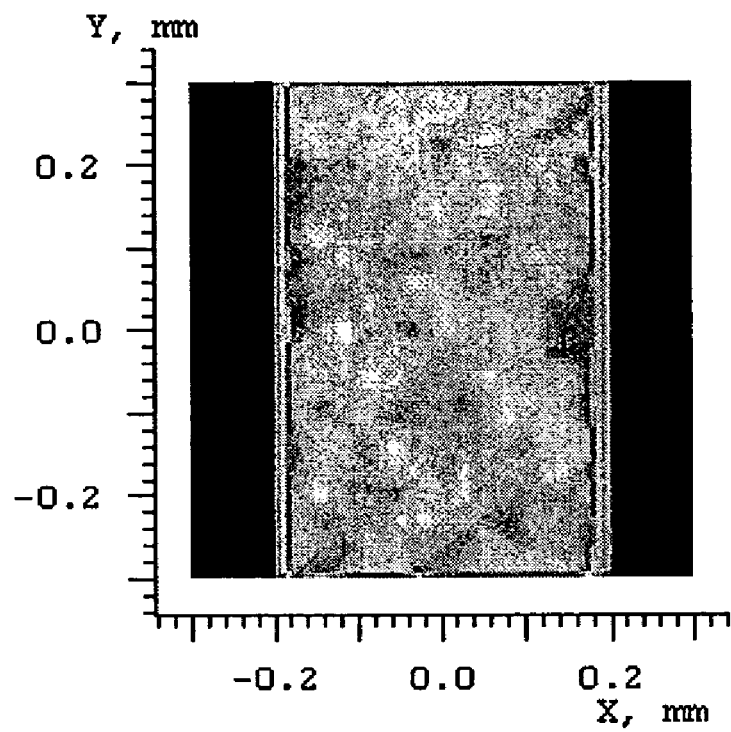
FIG. 3 shows the energy distribution of the rectangular beam spot processed by an optical device shown in FIG. 2.
Figure 3B:
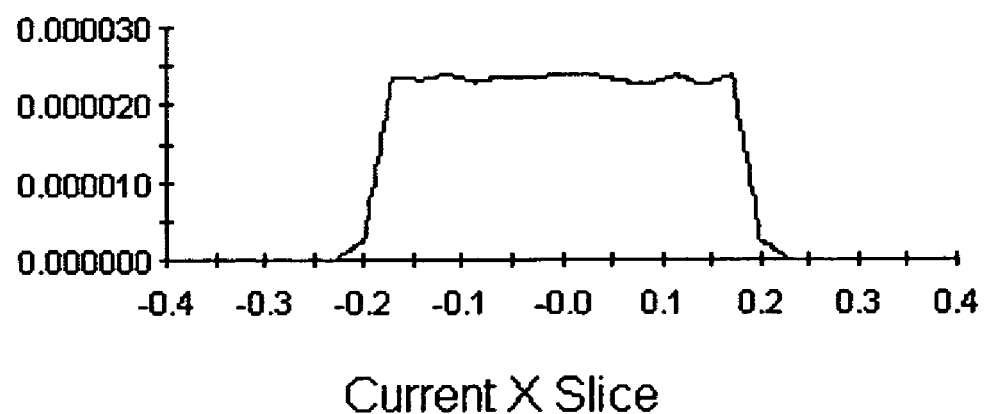

FIG. 3 shows the result of a simulation run with optical design software, wherein a beam spot with the homogenous energy distribution, which has a length of the long side direction of 300 mm and the length of the short side direction of 0.4 mm, can be obtained. FIG. 3A is a diagram showing the energy distribution at the part spreads ±0.3 mm in a direction of the long side and ±0.2 mm in a direction of the short side from the center of the rectangular beam spot. FIG. 3B shows a cross sectional view of the energy distribution at the center of a short side of the rectangular beam spot.

In the above structure, it is preferable that the laser oscillator combined with an optical system according to the present invention has high output in a wavelength band so as to be well absorbed by semiconductor films. If a silicon film is used for a semiconductor film, it is preferable that, considering the absorption index, the wavelength of the laser beam emitted from the laser oscillator used be equal to or less than 600 nm. Excimer lasers, YAG lasers (higher harmonics) and glass lasers (higher harmonics) may be used, for example, as laser oscillators for emitting this type of laser beams.

Further, although high power has not been attained with current technology yet, for example, $YVO_4$ lasers (higher harmonics), YLF lasers (higher harmonics), and Ar lasers, can be named as laser oscillators producing lasers with wavelengths suitable for crystallization of a silicon film.

Hereinafter, manufacturing method of a semiconductor device according to the present invention, wherein a beam homogenizer and a laser irradiation apparatus according to the present invention are applied will be described. First, a glass substrate ("Corning 1737 Glass") with a size of 127 mm square and 0.7 mm thick is prepared. The substrate sufficiently endures temperatures up to 600° C. On the glass substrate, a silicon oxide film is formed as a base film to a thickness of 200 nm. Further, an amorphous silicon film is formed on the silicon oxide film to have a thickness of 55 nm. Both of the films are formed by sputtering. Alternatively, they may be formed by plasma CVD.

The substrate formed with the deposited films is heated in a nitrogen atmosphere of 450° C. for one hour. The heating process serves to reduce the hydrogen content of the amorphous silicon film. When hydrogen contained in the amorphous silicon film is of large amount, this film cannot resist laser energy, and hence, the heating step is carried out. The hydrogen content of the film should properly be in the order of $10^{20}/cm^3$. Here, the expression "$10^{20}/cm^3$" signifies that $10^{20}$ hydrogen atoms exist per 1 $cm^3$.

In this Embodiment Mode, an XeCl excimer laser "L4308" manufactured by Lambda Physik, Inc. is used as a laser oscillator. The excimer laser is a pulsed laser. The maximum energy of the excimer laser is 670 mJ per pulse, the oscillating wavelength thereof is 308 nm, and the maximum frequency thereof is 300 Hz. When the energy fluctuation of the individual pulses of the pulse laser is confined within ±10%, preferably within ±5%, during the laser processing of one substrate, homogeneous crystallization can be effected.

The fluctuation of laser energy levels stated here is defined as follows: The average value of the laser energy levels in the time period of the irradiation of one substrate is set as a criterion, and the difference between the minimum energy or maximum energy and the average value in the time period is indicated in terms of %.

The irradiation with the laser beam is performed, for example, by scanning a stage on which a surface to-be-irradiated 1108 shown in FIG. 2 is placed in a direction of a short side of a rectangular beam spot. On this occasion, the energy density of the beam spot and the speed of the scanning on the surface to-be-irradiated 1108 may be properly determined by the operator of the optical system. As an approximate aim, the energy density lies within a range of 200 $mJ/cm^2$ to 1000 $mJ/cm^2$. When the scanning speed is appropriately chosen so that the widths of a short side direction of the rectangular beam spot may overlap each other within a range of about 90% or more, homogeneous laser annealing is performed with a high possibility. The optimum scanning speed depends upon the pulse frequency of the laser oscillator, and may be considered proportional to the frequency.

In this way, a laser annealing process is completed. A large number of substrates can be processed by repeating the process. A liquid crystal display of an active matrix type, for example, can be fabricated by utilizing the substrate. The fabrication may be done in accordance with a known method.

In the above example, the excimer laser is employed as the laser oscillator. The excimer laser is suitable for the optical system of the above described example since a coherence length thereof is exceedingly small as several μm. Some of the lasers mentioned below have a long coherence length originally, however, lasers with a coherence length changed artificially can be employed. The higher harmonics of a YAG laser or those of a glass laser are preferably utilized alternatively, for the reasons that a similar high power is attained, and that the energy of the laser beam is absorbed much by the silicon film. As laser oscillators suitable for the crystallization of the silicon film, such as a $YVO_4$ laser (higher harmonics), a YLF laser (higher harmonics), an Ar laser are given as examples. The wavelength band of these laser beams are absorbed well by the silicon film.

Although the amorphous silicon film is mentioned as the non-single crystalline semiconductor film in the above example, it is readily conjectured that the present invention will be applicable to other non-single crystalline semiconductor films. By way of example, the non-single crystalline semiconductor film may well be a compound semiconductor film having an amorphous structure, such as an amorphous silicon-germanium film. Alternatively, the non-single crystalline semiconductor film may well be used as a poly-crystalline silicon film.

Embodiment 1

An example of optical system other than the above-described optical system will be described here.

FIGS. 4A and 4B show an example of the optical system to be explained in this embodiment. First, a side view of FIG. 4B will be described. A laser beam emitted from the laser oscillator 1401 is propagated toward a direction of arrows indicated in the drawing. The beam spot is reduced in size in a direction of its shorter side using a 10 mm-thick cylindrical lens 1402 having a second surface of −182 mm in curvature radius. The light guide 1405, which has two reflective surfaces 1405a and 1405b facing to each other, is so placed that the beam inlet thereof lies in a focused area of the cylindrical lens. The light guide 1405 homogenizes the energy distribution of a beam spot. The light guide 1405 has a length of 300 mm in a direction in which a light beam travels and a distance of 0.4 mm between the reflective surfaces. An irradiation surface 1406 is placed at a location 0.2 mm away from the beam outlet of the light guide 1405. On the irradiation surface 1406, a rectangular beam spot having a homogenized energy distribution and measuring 0.4 mm in its shorter side is formed.

Second, a top view of FIG. 4A will be described. A laser beam emitted from the laser oscillator 1401 is propagated toward a direction of arrows indicated in the drawing. The beam passes through a cylindrical lens array 1403 composed of seven 3 mm-wide cylindrical lenses bonded in a direction of curvature, each having a first surface of +35 mm in curvature radius, whereby the beam is split in a direction of a longer side of the rectangle. The split beams pass through a 5 mm-thick cylindrical lens 1404 having a first surface of +816 mm in curvature radius, whereby the beams are overlapped on the irradiation surface 1406. Thus, a rectangular beam spot with its energy distribution homogenized in a direction of a longer side of the rectangle can be produced. In the case where the cylindrical lens 1404 has a longer focal length, the ability to condense light is impaired. On this account, the cylindrical lens 1404 does not have to be incorporated.

Figure 5A:
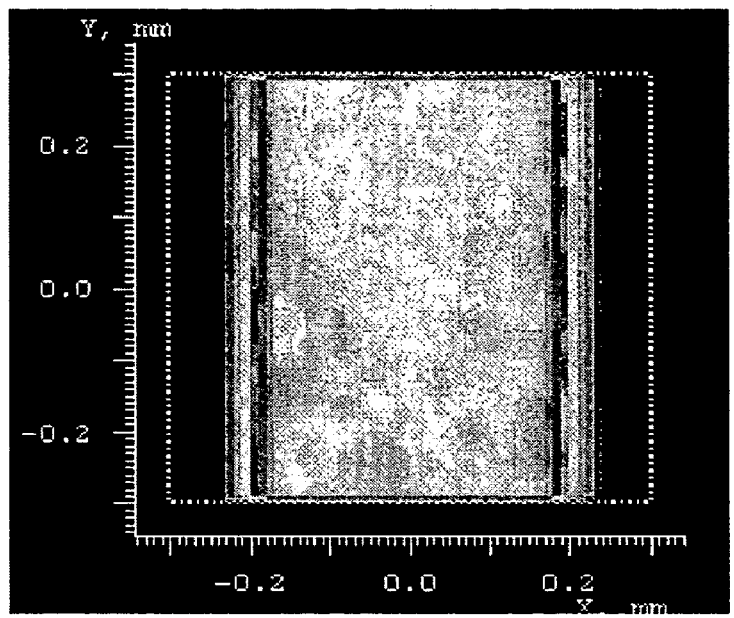
FIG. 5 shows the energy distribution of the rectangular beam spot processed by an optical system shown in FIG. 4.
Figure 5B:
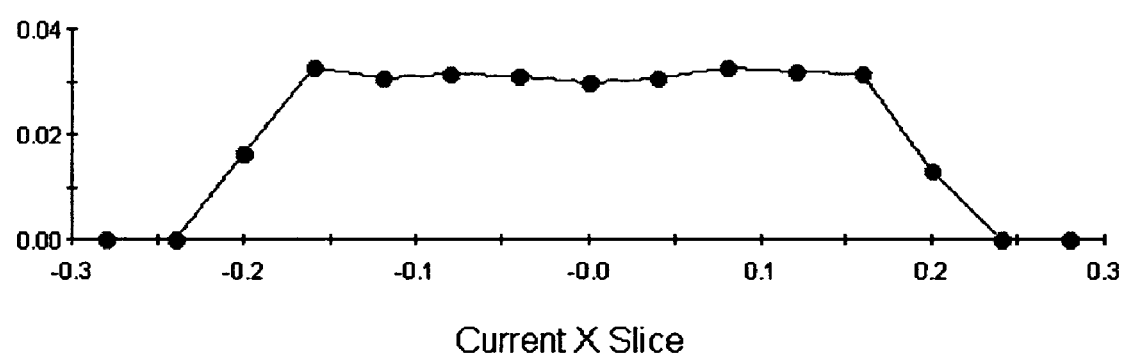

The optical system shown in FIGS. 4A and 4B allows the formation of a rectangular beam spot having a homogenized energy distribution and measuring 0.4 mm in a shorter side of the rectangle. FIGS. 5A and 5B show the result of the simulation performed with an optical design software. FIG. 5A is a view showing the energy distribution of a rectangular beam spot in a portion ranging ±0.3 mm in a longer side direction and ±0.2 mm in a shorter side direction from the center of the spot. FIG. 5B is a cross sectional view of the energy distribution of a rectangular beam spot in a center portion of the rectangle in a shorter side direction thereof.

Embodiment 2

An example of optical system other than the above-described optical systems will be described here. FIGS. 6A and 6B show an example of the optical system to be explained in this embodiment.

First, a side view of FIG. 6B will be described. In this drawing, a laser beam goes through exactly the same optical path as illustrated in FIGS. 4A and 4B until the laser beam reaches the light guide 1605 having two reflective surfaces 1605a and 1605b facing to each other. The light guide 1605 has two reflective surfaces facing to each other like the light guide 1405. The light guide 1605 measures 900 mm long in a direction in which a light beam travels and has a distance of 2.6 mm between the reflective surfaces. A light beam output from the light guide 1605 is shaped so as to form a rectangular beam spot measuring 2.6 mm in its shorter side with the energy distribution homogenized in a direction of the shorter side. The light beam output from the light guide 1605 is reduced in size by a doublet cylindrical lens 1606a and 1606b arranged 1000 mm behind the light guide 1605. Then, the beam is condensed on an irradiation surface 1607 arranged 220 mm behind the doublet cylindrical lens. The doublet cylindrical lens is composed of: a 10 mm-thick cylindrical lens having a first surface of +125 mm and a second surface of +69 mm in curvature radius; and a 20 mm-thick cylindrical lens having a first surface of +75 mm and a second surface of −226 mm in curvature radius. In addition, the spacing between the cylindrical lenses is 1 mm. On the irradiation surface 1607, there is formed a rectangular beam spot with the energy distribution homogenized in a direction of a shorter side of the rectangle. The doublet lens may be replaced with a 30 mm-thick cylindrical lens having a first surface of +963 mm in curvature radius and a second surface of −980 mm in curvature radius. In this case, the cylindrical lens is arranged 2000 mm behind the light guide 1605 and the irradiation surface 1607 is 2000 mm behind the cylindrical lens, preferably.

Second, a top view of FIG. 6A will be described. A laser beam emitted from the laser oscillator 1601 is propagated toward a direction of arrows indicated in this drawing. The beam passes through a cylindrical lens array 1603 composed of seven 3 mm-thick, 3 mm-wide cylindrical lenses bonded in a direction of curvature, each having a first surface of +35 mm in curvature radius, whereby the beam is split in a direction of a longer side of the rectangle. The split beams pass through a 5 mm-thick cylindrical lens 1604 having a first surface of +816 mm in curvature radius, whereby the beams are overlapped on the irradiation surface 1607. Thus, a rectangular beam spot with its energy distribution homogenized in a direction of a longer side of the rectangle can be produced. In the case where the cylindrical lens 1604 has a longer focal length, its ability to condense light is impaired. On this account, the cylindrical lens 1604 does not have to be placed necessarily.

Figure 7A:
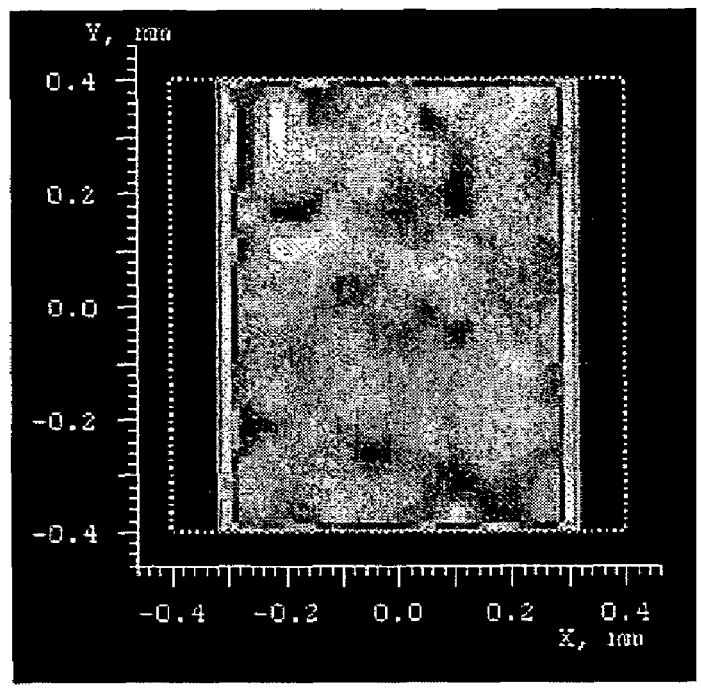
FIG. 7 show the energy distribution of the rectangular beam spot processed by an optical system shown in FIG. 6.
Figure 7B:
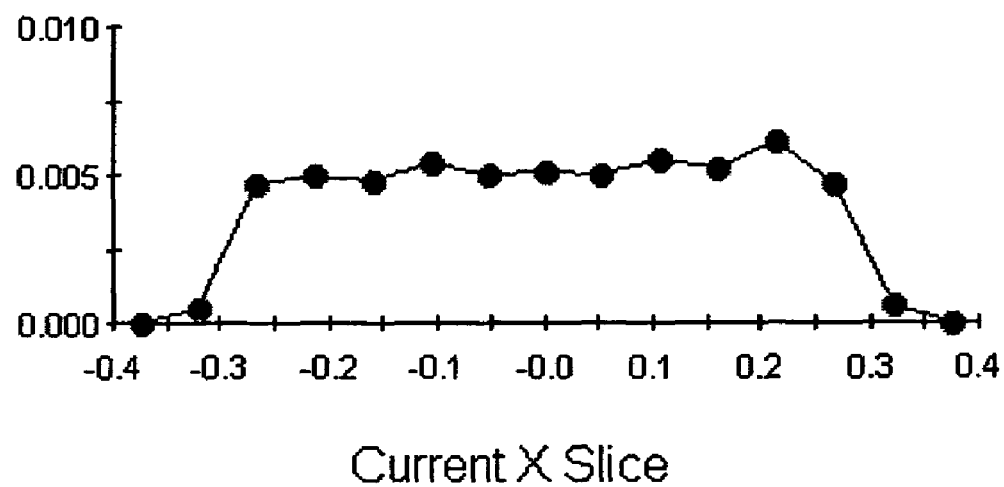

The optical system shown in FIGS. 6A and 6B allows the formation of a rectangular beam spot having a homogenized energy distribution and measuring 0.6 mm in a shorter side of the rectangle. FIGS. 7A and 7B show the result of the simulation performed with the optical design software. FIG. 7A is a view showing the energy distribution of a rectangular beam spot in a portion ranging ±0.3 mm in a longer side direction and ±0.2 mm in a shorter side direction from the center of the spot. FIG. 7B is a cross sectional view of the energy distribution of a rectangular beam spot in a center portion of the rectangle in a shorter side direction thereof.

The optical system shown in this embodiment may be used to perform the laser annealing of a semiconductor film, for example, under the method according to Embodiment Mode. The use of semiconductor films allows the manufacture of active matrix type liquid crystal displays, for example. Such manufacture may be carried out by those skilled in the art according to a known method.

Embodiment 3

An example of optical systems other than the above-described optical systems will be described here. FIGS. 8A and 8B show an example of the optical system to be explained in the embodiment.

In the drawings, a laser beam goes through exactly the same optical path as illustrated in FIGS. 4A and 4B except the light guide 1805. The light guide 1805 has two reflective surfaces facing to each other like the light guide 1405. The light guide 1405 has a hollow space between the two reflective surfaces facing to each other, whereas the light guide 1805 has a space filled with a medium 1805c having a refractive index of n between the reflective surfaces. This is different point between the two examples. In the case where the refractive index n of the medium is larger than that of the material from which the reflective surface is formed, a light beam is totally reflected off the reflective surface when the light beam enters the light guide 1805 at an angle smaller than or equal to the critical angle of incidence. In other words, on this occasion, the transmissivity of the light guide for a light beam becomes higher compared to the case where the beam does not undergo the total internal reflection. Therefore, a light beam from the light source 1801 can be condensed on the irradiation surface 1806 with higher efficiency. Incidentally, the cylindrical lens 1804 does not have to be placed necessarily.

Figure 9A:
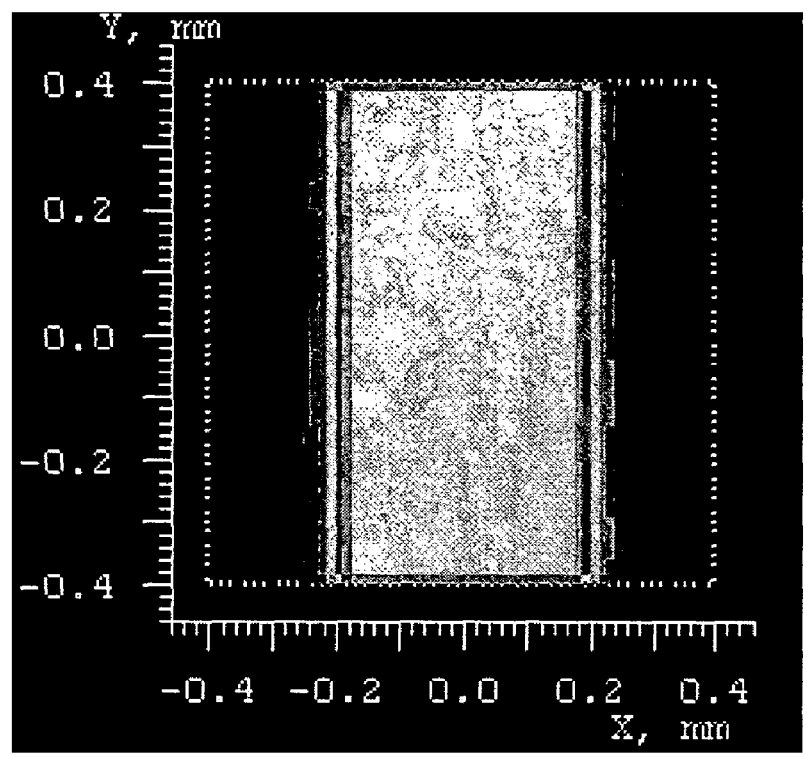
FIG. 9 show the energy distribution of the rectangular beam spot processed by an optical system shown in FIG. 8.
Figure 9B:
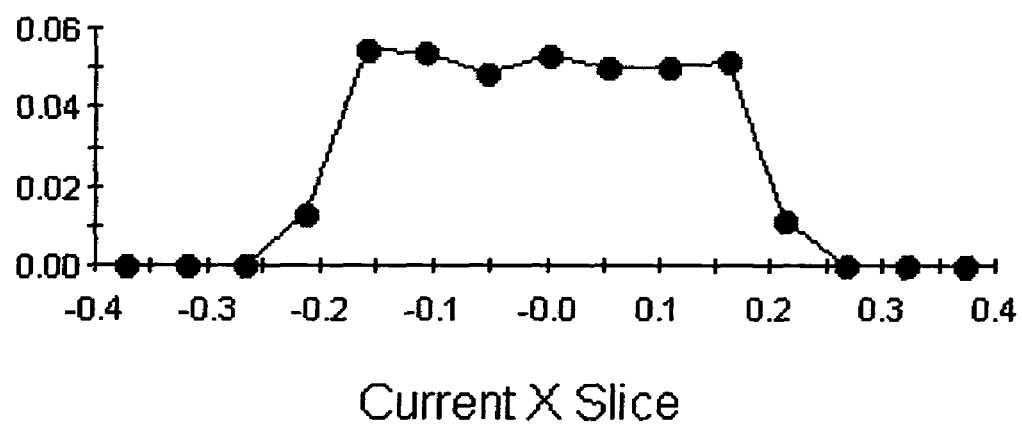
Figure 10A:
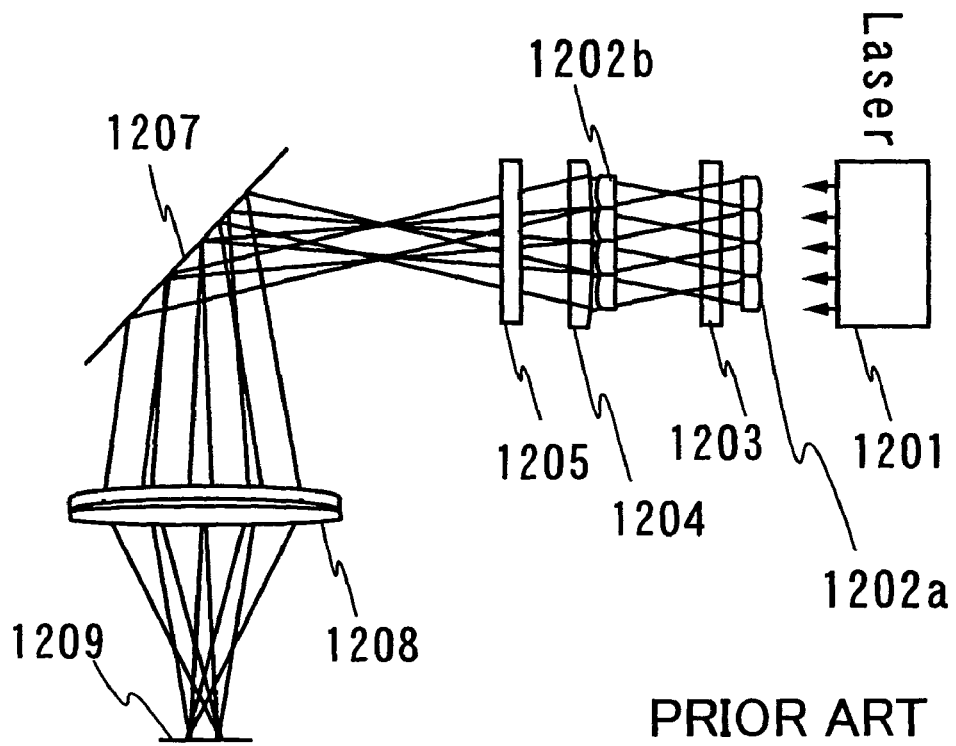
FIG. 10 shows a conventional laser irradiation apparatus.
Figure 10B:
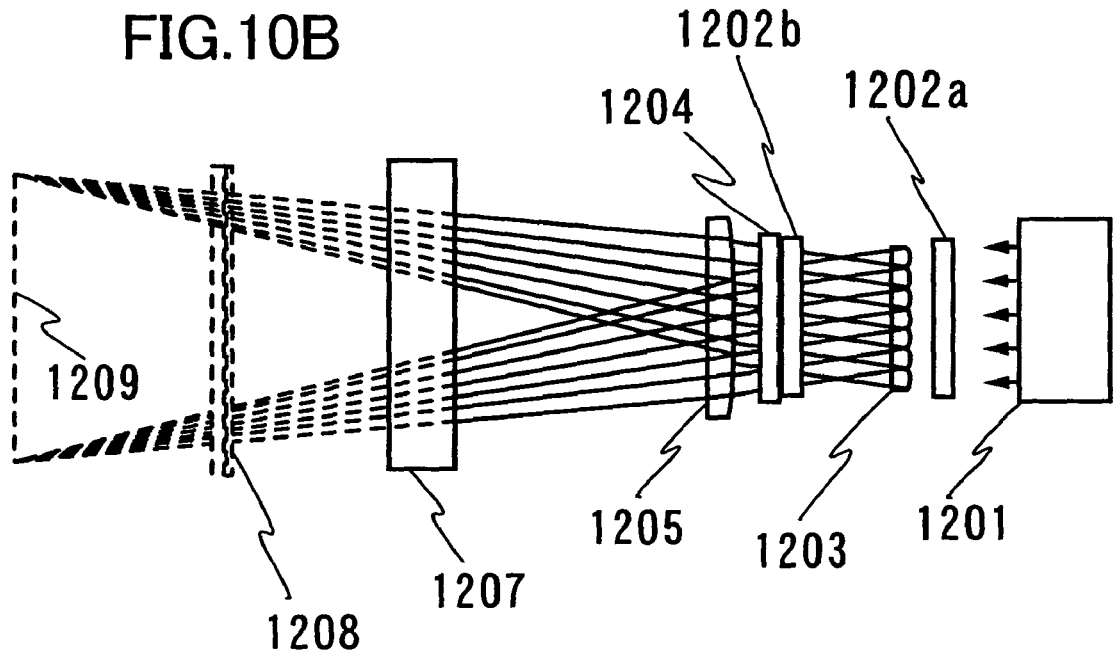

The optical system shown in FIGS. 8A and 8B allows the formation of a rectangular beam spot having a homogenized energy distribution and measuring 0.4 mm in a shorter side of the rectangle. The refractive indexes of the medium and the material from which the reflective surface is formed are herein 1.521 and 1.464, respectively. FIGS. 9A and 9B show the result of the simulation performed with the optical design software. FIG. 9A is a view showing the energy distribution of a rectangular beam spot in a portion ranging ±0.3 mm in a longer side direction and ±0.2 mm in a shorter side direction from the center of the spot. FIG. 9B is a cross sectional view of the energy distribution of a rectangular beam spot in a center portion of the rectangle in a shorter side direction thereof.

The optical system shown in this embodiment may be used to perform the laser annealing of a semiconductor film, for example, under the method according to Embodiment Mode. The use of semiconductor films allows the manufacture of active matrix type liquid crystal displays or electroluminescence displays, for example. Such manufacture may be carried out by those skilled in the art according to a known method.

The laser irradiation apparatus herein disclosed is characterized by having a homogenizer including a light guide or a light pipe as described above. The light guide or the light pipe have two reflective surfaces facing to each other and can homogenize the energy distribution at a shorter side direction of a rectangular beam spot on an irradiated surface.

What is claimed is:

1. A beam homogenizer comprising:
a cylindrical lens for converging a laser light in a width direction; and
a light guide for homogenizing an energy distribution of the laser light along the width direction of a line-shape on an irradiated surface,
wherein a beam spot of the laser light is shaped into the line-shape on the irradiated surface,
wherein the light guide comprises two reflective surfaces facing to each other, and
wherein the width direction is a direction of a short side of the line-shape on the irradiated surface.

2. A beam homogenizer comprising:
a cylindrical lens for converging a laser light in a width direction; and
a light pipe for homogenizing an energy distribution of the laser light along the width direction of a line-shape on an irradiated surface,
wherein a beam spot of the laser light is shaped into the line-shape on the irradiated surface,
wherein the light pipe comprises two reflective surfaces facing to each other, and
wherein the width direction is a direction of a short side of the line-shape on the irradiated surface.

3. A beam homogenizer comprising:
a first cylindrical lens for converging a laser light in a width direction;
a light guide for homogenizing an energy distribution of the laser light along the width direction of a line-shape on an irradiated surface; and
at least one second cylindrical lens for condensing the laser light output from the light guide along the width direction of the line-shape on the irradiated surface,
wherein a beam spot of the laser light is shaped into the line-shape on the irradiated surface,
wherein the light guide comprises two reflective surfaces facing to each other, and
wherein the width direction is a direction of a short side of the line-shape on the irradiated surface.

4. A beam homogenizer comprising:
a first cylindrical lens for converging a laser light in a width direction;
a light pipe for homogenizing an energy distribution of the laser light along the width direction of a line-shape on an irradiated surface; and
at least one second cylindrical lens for condensing the laser light output from the light pipe along the width direction of the line-shape on the irradiated surface,
wherein a beam spot of the laser light is shaped into the line-shape on the irradiated surface,
wherein the light pipe comprises two reflective surfaces facing to each other, and
wherein the width direction is a direction of a short side of the line-shape on the irradiated surface.

5. A beam homogenizer comprising:
a unit for homogenizing an energy distribution of a laser light along a length direction of a line-shape on an irradiated surface;
a cylindrical lens for converging the laser light in a width direction; and
a light guide for homogenizing the energy distribution along the width direction of the line-shape on the irradiated surface,
wherein the unit has at least a cylindrical lens array,
wherein a beam spot of the laser light is shaped into the line-shape on the irradiated surface,
wherein the light guide comprises two reflective surfaces facing to each other, and
wherein the width direction is a direction of a short side of the line-shape on the irradiated surface and the length direction is a direction of a long side of the line-shape on the irradiated surface.

6. A beam homogenizer comprising:
a unit for homogenizing an energy distribution of a laser light along a length direction of a line-shape on an irradiated surface;
a cylindrical lens for converging the laser light in a width direction; and
a light pipe for homogenizing the energy distribution along the width direction of the line-shape on the irradiated surface,
wherein the unit has at least a cylindrical lens array,
wherein a beam spot of the laser light is shaped into the line-shape on the irradiated surface,
wherein the light pipe comprises two reflective surfaces facing to each other, and
wherein the width direction is a direction of a short side of the line-shape on the irradiated surface and the lenath direction is a direction of a lona side of the line-shape on the irradiated surface.

7. A laser irradiation apparatus comprising:
a laser oscillator; and
a beam homogenizer,
wherein the beam homogenizer comprises a cylindrical lens for converging a laser light in a width direction and a light guide for homogenizing an energy distribution of the laser light along the width direction of a line-shape,
wherein a beam spot of the laser light is shaped into the line-shape on an irradiated surface, wherein the light guide comprises two reflective surfaces facing to each other, and wherein the width direction is a direction of a short side of the line-shape on the irradiated surface.

8. The laser irradiation apparatus according to claim 7, wherein the laser oscillator is a YAG laser, or a glass laser.

9. The laser irradiation apparatus according to claim 7, wherein the laser oscillator is a YVO$_4$ laser, a YLF laser, or an Ar laser.

10. A laser irradiation apparatus comprising:
a laser oscillator; and
a beam homogenizer,
wherein the beam homogenizer comprises a first cylindrical lens for converging a laser light in a width direction, a light guide for homogenizing an energy distribution of the laser light along the width direction of a line-shape, and at least one second cylindrical lens for condensing the laser light output from the light guide along the width direction of the line-shape,
wherein the light guide comprises two reflective surfaces facing to each other,
wherein a beam spot of the laser light is shaped into the line-shape on an irradiated surface, and
wherein the width direction is a direction of a short side of the line-shape on the irradiated surface.

11. The laser irradiation apparatus according to claim 10, wherein the laser oscillator is a YAG laser, or a glass laser.

12. The laser irradiation apparatus according to claim 10, wherein the laser oscillator is a YVO$_4$ laser, a YLF laser, or an Ar laser.

13. A laser irradiation apparatus comprising:
a laser oscillator; and
a beam homogenizer,
wherein the beam homogenizer comprises a cylindrical lens for converging a laser light in a width direction and a light pipe for homogenizing an energy distribution of the laser light along the width direction of a line-shape,
wherein a beam spot of the laser light is shaped into the line-shape on an irradiated surface,
wherein the light pipe comprises two reflective surfaces facing to each other, and
wherein the width direction is a direction of a short side of the line-shape on the irradiated surface.

14. The laser irradiation apparatus according to claim 13, wherein the laser oscillator is a YAG laser, or a glass laser.

15. The laser irradiation apparatus according to claim 13, wherein the laser oscillator is a YVO$_4$ laser, a YLF laser, or an Ar laser.

16. A laser irradiation apparatus comprising:
a laser oscillator; and
a beam homogenizer,
wherein the beam homogenizer comprises a first cylindrical lens for converging a laser light in a width direction, a light pipe for homogenizing an energy distribution of the laser light along the width direction of a line-shape, and at least one second cylindrical lens for condensing the laser light output from the light pipe along the width direction of the line-shape,
wherein the light pipe comprises two reflective surfaces facing to each other,
wherein a beam spot of the laser light is shaped into the line-shape on an irradiated surface, and
wherein the width direction is a direction of a short side of the line-shape on the irradiated surface.

17. The laser irradiation apparatus according to claim 16, wherein the laser oscillator is a YAG laser, or a glass laser.

18. The laser irradiation apparatus according to claim 16, wherein the laser oscillator is a YVO$_4$ laser, a YLF laser, or an Ar laser.

19. A method of manufacturing a semiconductor device, comprising the steps of:
forming a non-single-crystal semiconductor film on a substrate;
generating a laser beam with a laser beam oscillator;
using at least a cylindrical lens array, a cylindrical lens and a light guide to shape the laser beam so as to form a linear beam spot of a laser light on an irradiated surface with its energy distribution along a width direction homogenized;
setting the substrate with the non-single-crystal semiconductor film formed thereon on a stage to make a surface of the non-single-crystal semiconductor film coincide with the irradiated surface; and
performing a laser annealing of the non-single-crystal semiconductor film by irradiating the semiconductor film surface with the linear laser light while causing the stage to scan relative to the laser light,
wherein the cylindrical lens array acts on the linear beam spot along a length direction of the spot,
wherein the light guide and the cylindrical lens act on the linear beam spot along the width direction of the spot,
wherein the light guide comprises two reflective surfaces facing to each other, and
wherein the width direction is a direction of a short side of the linear beam spot and the length direction is a direction of a long side of the linear beam spot.

20. The method of manufacturing a semiconductor device according to claim 19, wherein the laser beam oscillator is a YAG laser, or a glass laser.

21. The method of manufacturing a semiconductor device according to claim 19, wherein the laser beam oscillator is a YVO$_4$ laser, a YLF laser, or an Ar laser.

22. A method of manufacturing a semiconductor device, comprising the steps of:
forming a non-single-crystal semiconductor film on a substrate;
generating a laser beam with a laser beam oscillator;
using at least a cylindrical lens array, a first cylindrical lens, a light guide and a second cylindrical lens to shape the laser beam so as to form a linear beam spot of a laser light on an irradiated surface with its energy distribution along a width direction homogenized;
setting the substrate with the non-single-crystal semiconductor film formed thereon on a stage to make a surface of the non-single-crystal semiconductor film coincide with the irradiated surface; and
performing a laser annealing of the non-single-crystal semiconductor film by irradiating the semiconductor film surface with the linear laser light while causing the stage to scan relative to the laser light,
wherein the cylindrical lens array acts on the linear beam spot along a length direction of the spot,
wherein the light guide, the first cylindrical lens and the second cylindrical lens act on the linear beam spot along the width direction of the spot,
wherein the light guide comprises two reflective surfaces facing to each other, and
wherein the width direction is a direction of a short side of the linear beam spot and the length direction is a direction of a long side of the linear beam spot.

23. The method of manufacturing a semiconductor device according to claim 22, wherein the laser beam oscillator is a YAG laser, or a glass laser.

24. The method of manufacturing a semiconductor device according to claim 22, wherein the laser beam oscillator is a YVO₄ laser, a YLF laser, or an Ar laser.

25. A method of manufacturing a semiconductor device, comprising the steps of:
forming a non-single-crystal semiconductor film on a substrate;
generating a laser beam with a laser beam oscillator;
using at least a cylindrical lens array, a cylindrical lens and a light pipe to shape the laser beam so as to form a linear beam spot of a laser light on an irradiated surface with its energy distribution along a width direction homogenized;
setting the substrate with the non-single-crystal semiconductor film formed thereon on a stage to make a surface of the non-single-crystal semiconductor film coincide with the irradiated surface; and
performing a laser annealing of the non-single-crystal semiconductor film by irradiating the semiconductor film surface with the linear laser light while causing the stage to scan relative to the laser light,
wherein the cylindrical lens array acts on the linear beam spot along a length direction of the spot,
wherein the light pipe and the cylindrical lens act on the linear beam spot along the width direction of the spot,
wherein the light pipe comprises two reflective surfaces facing to each other, and
wherein the width direction is a direction of a short side of the linear beam spot and the length direction is a direction of a lona side of the linear beam spot.

26. The method of manufacturing a semiconductor device according to claim 25, wherein the laser beam oscillator is a YAG laser, or a glass laser.

27. The method of manufacturing a semiconductor device according to claim 25, wherein the laser beam oscillator is a YVO₄ laser, a YLF laser, or an Ar laser.

28. A method of manufacturing a semiconductor device, comprising the steps of:
forming a non-single-crystal semiconductor film on a substrate;
generating a laser beam with a laser beam oscillator;
using at least a cylindrical lens array, a first cylindrical lens, a light pipe and a second cylindrical lens to shape the laser beam so as to form a linear beam spot of a laser light on an irradiated surface with its energy distribution along a width direction homogenized;
setting the substrate with the non-single-crystal semiconductor film formed thereon on a stage to make a surface of the non-single-crystal semiconductor film coincide with the irradiated surface; and
performing a laser annealing of the non-single-crystal semiconductor film by irradiating the semiconductor film surface with the linear laser light while causing the stage to scan relative to the laser light,
wherein the cylindrical lens array acts on the linear beam spot along a length direction of the spot,
wherein the light pipe, the first cylindrical lens and the second cylindrical lens act on the linear beam spot along the width direction of the spot,
wherein the light pipe comprises two reflective surfaces facing to each other, and
wherein the width direction is a direction of a short side of the linear beam spot and the length direction is a direction of a long side of the linear beam spot.

29. The method of manufacturing a semiconductor device according to claim 28, wherein the laser beam oscillator is a YAG laser, or a glass laser.

30. The method of manufacturing a semiconductor device according to claim 28, wherein the laser beam oscillator is a YVO₄ laser, a YLF laser, or an Ar laser.

31. A method of manufacturing a semiconductor device comprising:
providing a laser light;
passing the laser light through a cylindrical lens for converging the laser light in a width direction;
passing the laser light through a light guide; and
irradiating a semiconductor film with the laser light after passing through the light guide to crystallize the semiconductor film,
wherein an energy distribution along the width direction of the laser light at a surface of the semiconductor film is homogenized by the light guide,
wherein the light guide comprises two reflective surfaces facing to each other, and
wherein the width direction is a direction of a short side of the laser light.

32. A method of manufacturing a semiconductor device comprising:
providing a laser light;
passing the laser light through a cylindrical lens for converging the laser light in a width direction;
passing the laser light through a light pipe; and
irradiating a semiconductor film with the laser light after passing through the light pipe to crystallize the semiconductor film,
wherein an energy distribution along the width direction of the laser light at a surface of the semiconductor film is homogenized by the light pipe,
wherein the light pipe comprises two reflective surfaces facing to each other, and
wherein the width direction is a direction of a short side of the laser light.

33. A method of manufacturing a semiconductor device comprising:
providing a laser light having a cross section perpendicular to a propagation direction of the laser light wherein the cross section has a length and a width;
increasing only the length of the cross section of the laser light;
passing the laser light through a cylindrical lens for converging the laser light in a width direction;
passing the laser light through a light guide; and
irradiating a semiconductor film with the laser light after passing through the light guide to crystallize the semiconductor film,
wherein an energy distribution of the laser light along a width direction of the cross section is homogenized by the light guide,
wherein the light guide comprises two reflective surfaces facing to each other, and
wherein the width direction is a direction of a short side of the laser light.

34. A method according to claim 33, wherein the length of the cross section of the laser light is increased by using a cylindrical lens array having a plurality of cylindrical lenses.

35. A method of manufacturing a semiconductor device comprising:
providing a laser light having a cross section perpendicular to a propagation direction of the laser light wherein the cross section has a length and a width;
increasing only the length of the cross section of the laser light;
passing the laser light through a cylindrical lens for converging the laser light in a width direction;

passing the laser light through a light pipe; and irradiating a semiconductor film with the laser light after passing through the light pipe to crystallize the semiconductor film, wherein an energy distribution of the laser light along a width direction of the cross section is homogenized by the light pipe, wherein the light pipe comprises two reflective surfaces facing to each other, and wherein the width direction is a direction of a short side of the laser light.

36. A method according to claim 35, wherein the length of the cross section of the laser light is increased by using a cylindrical lens array having a plurality of cylindrical lenses.

37. The laser irradiation apparatus according to claim 7, wherein the laser oscillator is an excimer laser.

38. The laser irradiation apparatus according to claim 10, wherein the laser oscillator is an excimer laser.

39. The laser irradiation apparatus according to claim 13, wherein the laser oscillator is an excimer laser.

40. The laser irradiation apparatus according to claim 16, wherein the laser oscillator is an excimer laser.

41. The method of manufacturing a semiconductor device according to claim 19, wherein the laser beam oscillator is an excimer laser.

42. The method of manufacturing a semiconductor device according to claim 22, wherein the laser beam oscillator is an excimer laser.

43. The method of manufacturing a semiconductor device according to claim 25, wherein the laser beam oscillator is an excimer laser.

44. The method of manufacturing a semiconductor device according to claim 28, wherein the laser beam oscillator is an excimer laser.

* * * * *